United States Patent Office 3,526,537
Patented Sept. 1, 1970

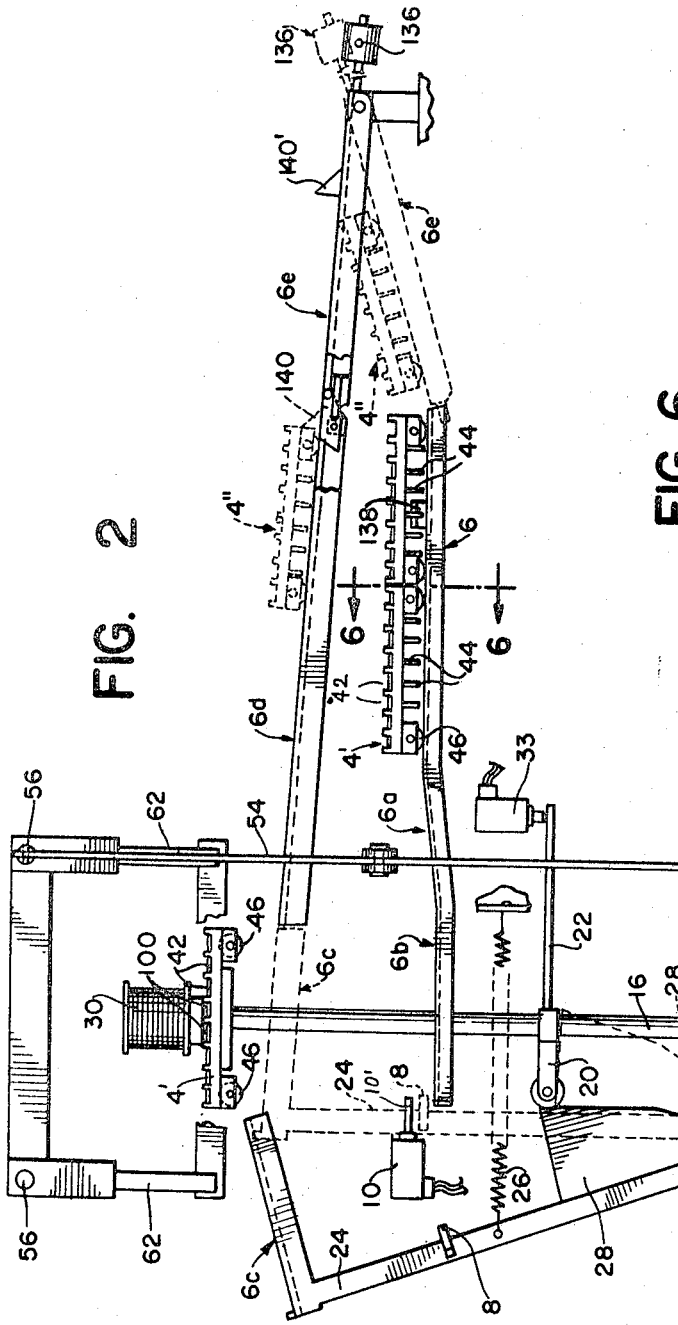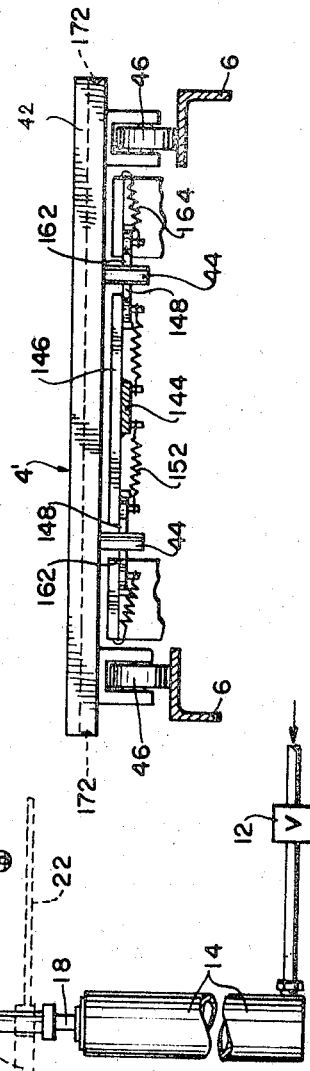

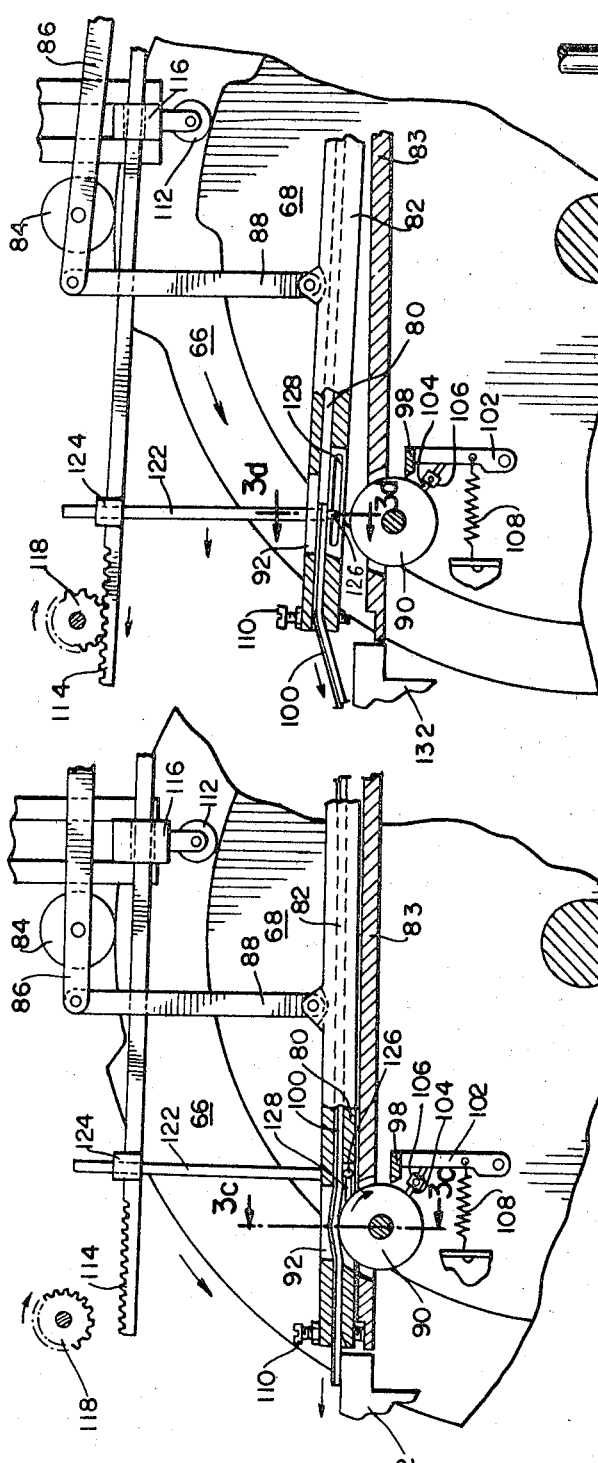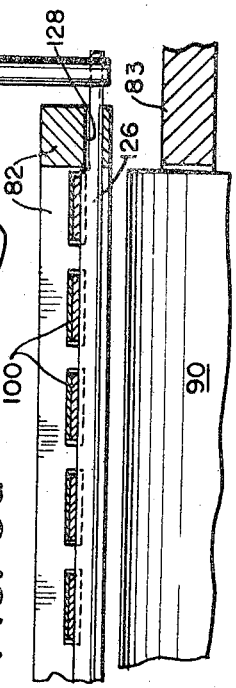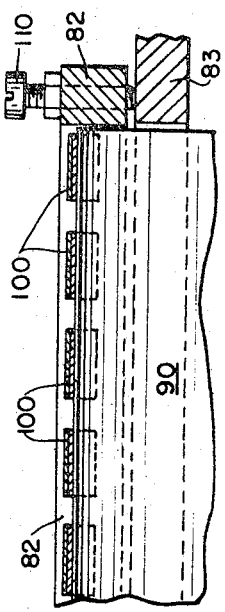

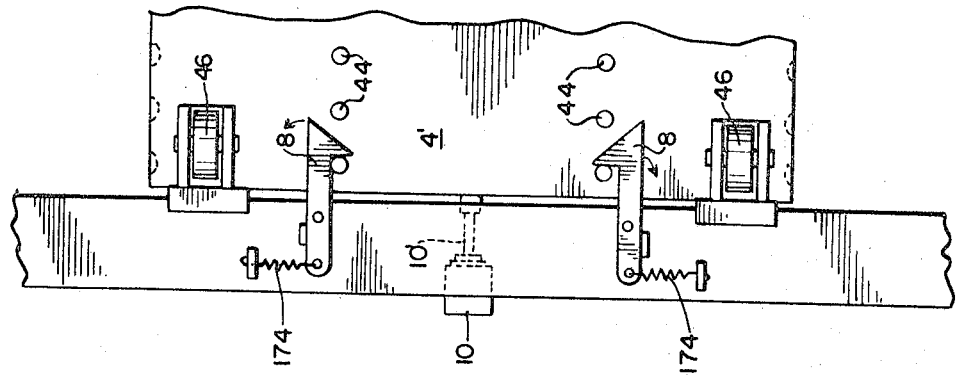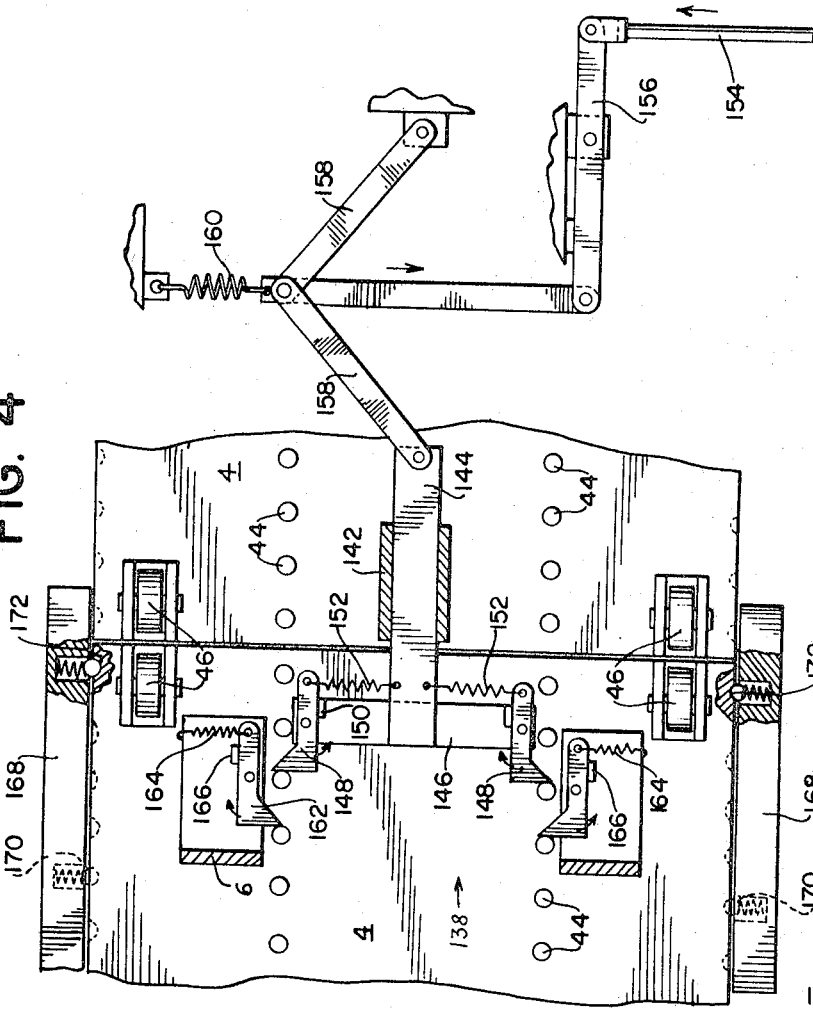

3,526,537
METHOD FOR WAXING LINED AND CUT LAMINATIONS FOR X-RAY ANTI-DIFFUSING SCREENS
Kurt Schumann, Radebeul, and Heinz Ehrentraut, Dresden, Germany, assignors to VEB Transformatoren- und Rontgenwerk Dresden, Dresden, Germany
Original application Aug. 19, 1965, Ser. No. 481,048, now Patent No. 3,489,123. Divided and this application Feb. 14, 1969, Ser. No. 810,440
Int. Cl. B44d 1/02
U.S. Cl. 117—120       7 Claims

ABSTRACT OF THE DISCLOSURE

Method for waxing lined and cut laminations for X-ray anti-diffusing screens, comprising the steps of inserting a number of previously cut and lined laminations one by one into a carriage while moving the same stepwise in a direction transverse to that in which the laminations are inserted, transporting the carriage to another location spaced apart from the location where the laminations are inserted, removing the laminations simultaneously from the carriage at the other location, and subsequently waxing the laminations.

---

This application is a division of application Ser. No. 481,048, filed Aug. 19, 1965, now Pat. No. 3,489,123 of Jan. 13, 1970, entitled "Equipment for Waxing Lined and Cut Laminations for X-Ray Antidiffusing Screens."

The present invention relates to a method for waxing lined and cut laminations for X-ray anti-diffusing screens, which are taken over continually and at a relatively high speed from a cutting tool of another equipment making the laminations. More particularly, the invention relates to a method wherein the laminations arriving from the other equipment are received by appropriate transport means, for example a carriage, and are successively conveyed to a waxing device and subsequently to a cooling device, the empty carriages being then returned to a receiving position for the next operational cycle.

X-ray anti-diffusing screens are practically always focussed, that is, the individual laminations are so aligned in the screen that the extensions of their flanks intersect at a point, the focal point of the X-ray tube. This focussing is achieved by providing the individual laminations, before they are stacked together, with a more or less thick wax coat or layer, depending on the desired degree of focussing and the shaft ratio. These prepared laminations are then engaged at their ends by clamping or terminal contacts over which an electric current flow through the lead foil of the laminations. Due to the action of this current, the lead foil is heated and with it the wax layer.

The individual laminations are then pressed by a swivable lever, which is suspended in the desired focal distance and on which the clamping contacts are arranged, into the screen frame and against each other. After the electric current is shut off, the previously soft or plastic wax coat solidifies again, the individual laminations adhere to each other and are focussed, due to the action of the lever suspended in the respective focal distance, the wax coat forming a micro wedge between two individual, adjoining laminations.

In order to insure a satisfactory focussing of the individual laminations, it is necessary, on the one hand, that the wax coat have a certain volume which can be adjusted according to the focussing degree and the shaft ratio, and that, on the other hand, the wax coat have a uniform thickness over the entire length of the laminations of a certain screen type.

It is also necessary that a zone remain wax-free at the head and at the end of each lamination, otherwise the melting wax will cover the electric clamping contacts of the X-ray stratigraphy (layer photography) device and jeopardize the satisfactory operation of this device.

An apparatus for waxing lead laminations for X-ray anti-diffusing screens is known where several laminations are inserted by hand side by side into a track. These inserted laminations are subsequently pushed automatically by a slide between two transport of feed rolls which guide the laminations to a waxing roll. This roll is swung toward the laminations as soon as the wax-free head of the laminations has passed over the roll.

When the laminations are almost completely waxed, the waxing roll is swung away again, so that the ends of the laminations also remain wax-free. A strap provided in a pivotable manner under the laminations additionally moves the ends of the laminations beyond the waxing roll, so that the freely suspended lamination ends do not touch again the swung-out waxing roll. The amount of wax to be applied to the laminations and the thickness of the wax coat are adjusted on a stripping plate whose distance from the surface of the waxing roll is adjustable.

After the laminations have passed through the waxing roll they are conducted over a cooling device which blows cooled compressed air over them, and subsequently they are fed by a short conveyor belt to a delivery plate from where they are removed by hand.

Both the slide and the pivotal movements of the waxing rolls and of the strap are actuated in the known apparatus over stops which are arranged on a moving endless chain and which are set on the latter corresponding to the succession of the individual processes.

The known arrangement has various disadvantages. Thus, it must be considered economically and technically extremely unfavorable that the laminations must be inserted and removed into and from the arrangement by hand. Since the separate processes inside the arrangement take place within relatively short time intervals (about every 10 seconds), due to the chain control, this requires great skill, particularly of the inserting operator, so that the required number of laminations be inserted in each working interval or cycle. Besides, such a manual feeding and removal is completely unsuitable in view of the mechanization and automation to be achieved in the manufacture of screen laminations.

Another disadvantage is that the individual processes in the arrangement are released by stops secured on a chain or on chains. Since chains are subject to a continuous but not uniform change in length, the maintenance of exact releasing or operating points, such as the swinging of the waxing roll and of the strap, are only possible with some degree of accuracy if the stops are regularly adjusted.

The swinging of the waxing roll at the start and at the end of the waxing operation is also extremely unfavorable, since the tank for the liquid wax and the related devices for heating and temperature stabilisation are also swung with the waxing roll. The masses to be moved are thus relatively great.

Finally it is also a disadvantage that although the stripping plate on the waxing roll is adjustable in its distance to the surface of the latter, but is rigid with respect to the waxing roll once it is adjusted. When the waxing roll does not run perfectly round (is out of true), the distance between the surface of the waxing roll and the stripping plate varies during each revolution of the waxing roll, and consequently also the amount of wax applied to the laminations.

One of the objects of the present invention is to eliminate the economical and technical disadvantages inherent in the known process for waxing screen laminations.

One object of the invention is to provide a method of waxing X-ray laminations, which permits to receive fully automatically the individual screen laminations arriving at a relatively high speed from another equipment, serving for the making of X-ray laminations, subsequently to convey them at a relatively low speed, wax them, cool them, and to deposit them in corresponding cassettes or to feed them immediately to an X-ray layer photography device.

It should be noted that a co-pending patent application of the inventors Rudolf Klemm et al., entitled "Equipment for Making Laminations for X-Ray Anti-Diffusing Screens," Ser. No. 481,049, filed Aug. 19, 1965, now Pat. 3,398,039 of Aug. 20, 1968, fully describes the production of laminations before they reach the waxing equipment for practising the method according to the present application.

The individual processes in the present invention are so controlled that no control errors can be caused by changes in the material and other external influences. Besides, the wax coat and amount are accurately adjustable, and can be kept constant without any difficulty.

According to important features of the inventive method, a number of previously cut and lined laminations are inserted one by one into a carriage at a first location while moving the carriage stepwise in a direction transverse to the direction in which the laminations are inserted, the carriage is transported to a second location spaced apart from the first location, the laminations are all removed simultaneously from the carriage at the second location, and finally the laminations are waxed.

It is advantageous to cool the laminations subsequent to the waxing step.

The empty carriage is returned from the second location into ready position at the first location, so as to keep the same available for the inserting step of the next operational cycle.

The invention contemplates the simultaneous insertion and removal of the laminations at the respective first and second locations. These steps can be performed cyclically, in an uninterrupted manner, by the aid of at least two carriages.

According to another novel feature of the invention, the transporting step may be performed by vertical movement between the first and second locations.

The invention furthermore provides the removing and waxing steps to be performed in a single continuous and substantially rectilinear operation.

The object of the invention is solved, according to one of the major features, so that the screen laminations, arriving at high speed from the cutting tool of another equipment for making screen laminations, are received individually by transport means moving, preferably in steps, transverse to the direction of motion of the laminations, for example a carriage, after which the filled transport means is fed to a removing device. The latter device then conveys all laminations contained in the carriage, at a relatively low speed, simultaneously through a waxing device and subsequently through a cooling device, and the empty carriage is brought into ready position to receive again new laminations from the other equipment. In the following, further features of the inventive method will be explained by reference to an exemplary embodiment of a suitable waxing equipment.

According to the invention, the number of carriages provided is such that in properly co-ordinated operational cycles, the reception of the laminations arriving from the cutting tool as well as the transportation to the removing device, the actual removal of the laminations and the positioning of an empty carriage for the reception of new laminations can be effected at least approximately at the same time.

For practising the inventive waxing method, the equipment comprises a multi-section transporting or conveyer track for the carriages, arranged in two superposed planes, which is horizontal in the receiving zone of the laminations, at least partly inclined in the feed zone to a vertically acting conveyer, partly laterally displaceable in the operational range of this conveyer, likewise an inclined plane or slope in the removal zone of the empty carriage, and formed as a rocker in the positioning zone of the empty carriage for the reception of new laminations.

A stepwise movement of the carriages in the lamination reception zone can be achieved according to the invention so that a linkage or rod, actuated by the drive of the cutting tool at each stroke of the latter, moves in steps a slide over a double-armed or toggle lever joint; on the slide are pivotally mounted two pawls bearing on a stop under spring action, these pawls engaging each one of several pins arranged in two rows on the underside of the carriages, and moving the same forward by one step. Two additional pivotable pawls, likewise spring-biased toward a stop but rigidly connected with the equipment and with the conveyor track, respectively, reach behind a pin at the ends of the individual steps.

Each filled carriage rolls on the conveyor-track section designed as a slope into a postion secured, for example, by ratchets and releases or disconnects there the vertical conveyor, for example, over a limit switch which, in turn, connects a pneumatic lifting device over a magnetic slide valve. Appropriate means are provided, for example a stop, arranged on the conveyor, and a cam connected with the laterally displaceable section of the conveyor track, which means laterally displace said section of the conveyor track at the start of the vertical transport movement of the carriage, and which return it again to its original position with the return of the transport device.

The removing position into which the filled carriage is moved by the vertical conveyor or transport device is above the partly laterally displaceable track section. In this position, the carriage is held so long by suitable holding means, for example by magnets connected or energised by the carriage and controlled by an electric time switch, until the laminations have been removed therefrom.

The removal of the laminations is effected in the equipment by a device which comprises a spring-loaded slide and a constantly revolving pair of transport rollers. The vertical conveyor actuates the slide in its upper end portion, or shortly before it reaches the latter, over suitable means, for example, an electric switch which operates a pull magnet which, in turn, engages a rack with a constantly revolving pinion, this slide pushing all laminations contained in the carriage simultaneously between the pair of transport rollers.

According to the invention, a pivotable guide plate is arranged behind the transport rollers for the laminations to be waxed, which plate is pivoted by a control device released by the slide of the removing device, for example, by a gear wheel provided with a cam disk which can be engaged by the slide, so that the laminations come into contact with a waxing roll in such a manner that wax-free zones remain at both ends of the laminations. The thickness of the applied wax coat is adjustable by varying the swivelling path of the guide plate, for example by adjustable stop screws.

The amount of the wax applied to the laminations is adjustable by means of a pivotable stripping device arranged ahead of the waxing roll and provided with an adjustable feeler pin or roller running on the wax-free edge of the waxing roll surface.

With the control device released by the slide of the removing device, is also connected another cam disk which so influences a strap guided under the laminations to be waxed, for example over a feeler roller which effects the engagement of a rack with a constantly revolving pinion, that the strap lifts the wax-free ends of the waxed laminations above the waxing roll.

For carrying out the inventive method, a cooling device, for example, a nozzle plate traversed by cooled compressed air, is arranged in the equipment behind the waxing roll and outside the range of the pivotable guide plate, and behind this cooling device a pair of constantly revolving transport rollers whose distance from the pair of transport rollers of the removing device is less than one lamination length.

The empty carriage drops, after the laminations have been removed, on the conveyor track section designed as an inclined plane and rolls from there to the rocker. This rocker consists of a double-armed lever whose one arm carries an adjustable counterweight while the other arm serves to receive an empty carriage and descends, due to the mass or weight of this carriage, so that the connection to the lower level of the conveyor track is established.

The various objects, features and attendant advantages of the present invention will become more apparent from the following description of the method for waxing X-ray laminations according to this invention, when considered in conjunction with the accompanying drawings, wherein FIG. 1 is a somewhat simplified side elevational view of a waxing equipment for practising the inventive method;

FIG. 2 is a side view of the conveyor track and of the vertical conveyor for the carriages of the equipment;

FIGS. 3a and 3b are partial views of the equipment appearing in FIG. 1, in two different operational phases;

Figure 1:
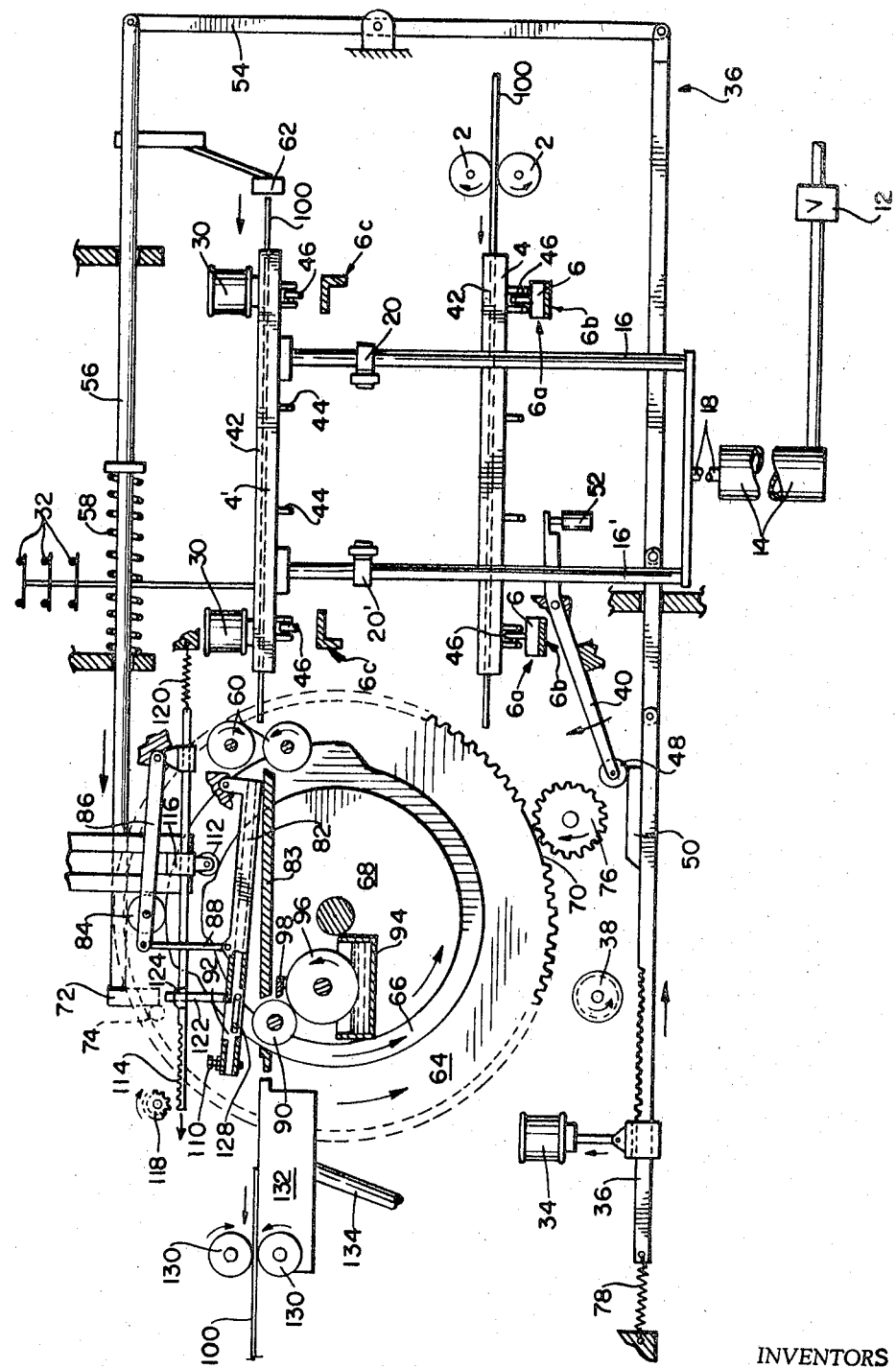

FIGS. 3c and 3d are respective sectional views, taken along lines 3c—3c and 3d—3d, respectively, in FIGS. 3a and 3b;

FIG. 4 is a view of the apparatus for moving the carriages stepwise on the conveyor track in the receiving zone of the laminations, seen from the bottom toward the moving carriage;

FIG. 5 is a detail view, showing means for stopping a filled carriage in the range of the vertical conveyor, likewise seen from the bottom toward the filled carriage; and FIG. 6 is a rear view of a carriage, taken along line 6—6 of FIG. 2.

For a better understanding of the inventive waxing method, the exemplary equipment will first be described in detail. To begin with, reference will be had to FIGS. 1, 2 and 6 wherein number 100 designates the cut and lined lead laminations made in another equipment. These are fed to the equipment by means of transport rollers 2, for example, from the cutting tool of the other equipment, or from an intermediate testing device, at relatively high speed.

Since the waxing in the present equipment must be effected at considerably lower speed, it is necessary to reduce the speed of the arriving laminations 100, without interrupting the continuity or the working process, for example, within an assembly line producton. This is achieved by providing carriages 4 having specially provided grooves 42 into which the laminations 100 are pushed by the transport rollers 2. The carriages move in steps, transverse to the direction of motion of the arriving laminations.

By this expedient, it is possible to reduce the driving speed of the waxing equipment to an integral fraction of the speed at which the laminations arrive, depending on the capacity of a filled carriage, numbered 4', or the number of grooves 42 contained therein.

Each filled carriage 4' is now pushed in steps by a certain amount on a first conveyer track section 6 by the following carriage 4 which is just being filled. When the push carriage 4' reaches a second track section 6a, designed as an inclined plane, the carriage rolls under its own weight against a pawl-shaped stopping device 8 which is shown in more detail in FIG. 5. It should be added further track sections will be described as the description proceeds.

The carriage 4' strikes at the same time against a limit switch 10 which actuates a magnetic slide valve 12 of a pneumatic lifting device (cylinder) 14. Two arms 16, 16' are connected with a piston 18 of the lifting device; as shown in FIG. 2 by broken lines, these elements are in a position below the carriage 4' and between the two rails of a further conveyor track section 6b, in operative connection with the first section 6a, before the magnetic slide valve 12 is actuated. Switch 10 has a plunger 10'.

On the arms 16, 16' are secured respective stops 20, 20' provided with rollers, and on one of these stops, 20, is arranged a rigid switch finger 22. A third conveyer track section 6c above the lifting device 14 is pivotally mounted above each arm 24, and against the action of a spring 26. The fourth and fifth track sections will be described somewhat later. Before the magnetic slide valve 12 is actuated, that is, before the lifting device 14 becomes effective, the track section 6c and the arm 24 are, respectively, under the stop 20 (FIG. 2) and the depressed part (not shown) in the position shown in broken lines.

When the lifting device becomes effective by the actuation of the magnetic slide valve 12 over the limit switch 10 by a filled carriage 4', the arms 16, 16' lift the filled carriage 4' upward from the stopping device 8. At the same time, the stops 20, 20' likewise move upward and pivot, over cams 28 secured to the arms 24, the track section 6c into the position indicated by solid lines in FIG. 2 so that the filled carriage 4' is lifted above the track section 6c.

The carriage 4' is now guided toward two holding magnets 30 which are already energized by the limit switch 10 or by an additional switch 32 actuated by the carriage 4' lifted against the holding magnets 30.

Additionally, the switch 32 closes the magnetic slide valve 12 and connects an appropriate time relay (not represented) which keeps the holding magnets 30 energized until the unloading of the carriage 4' is completed, as will be described below. The switch finger 22 actuates another switch 33 at the moment when the filled carriage 4' reaches the holding magnets and is held thereby, this switch energizing a pull magnet 34.

This magnet pulls a partly toothed push-rod or rack 36 upward so that its teeth engage a constantly revolving pinion 38. Besides, the rising of the push-rod 36 results in the rotation of an angle lever 40 running, with a feeler roll 48, along a cam 50 of the push-rod 36 which, in turn, closes the holding circuit for the pull magnet 34 over a switch 52.

The magnetic slide valve 12 has already been closed, as mentioned above, over the switch 32, by the carriage 4' raised by the lifting device 14 to the holding magnets 30. This means that the piston 18 and thus the arms 16, 16' move down again, while the carriage is held by the magnets 30 under the action of the time relay energized by the switch 32. During the descent of arms 16, 16', the track section 6c is closed again under the action of the springs 26; that is, it moves into the position indicated in FIG. 2 in broken lines. Besides, the switch 33 actuated by finger 22 is opened again by the returning finger, but the pull magnet 34 energized thereby remains energized under the action of switch 52. Below the track section 6b, the receiving surfaces of the arms 16, 16' stop, and are thus ready for the next transportation of a filled carriage.

The following process takes place simultaneously with the descent of the lifting device 14. The pull magnet 34, energized by the switch 33 which is actuated by finger 22, and held by the switch 52, has effected the engagement of the toothed portion of the push-rod 36 with the pinion 38, as described above. The push-rod 36 thus moves in the direction of the arrow, the rollers 48 rolling on the cam 50 and keeping the switch 52 closed.

The movement of the push-rod 36 effects the rotation of a lever 54 which moves another push-rod 56 against the action of a spring 58 in such a way that the latter pushes the laminations 100 between a pair of transport rollers 60 by means of an ejector bar 62 touching simultaneously all laminations 100 contained in the carriage. On the other hand, the displacement of the push-rod 56 has the effect that a gear wheel 64, which carries two cam disks 66, 68 and which is not toothed at a point 70, is so moved over a nose 72, arranged on the push-rod 56 and a bolt 74, secured to the gear wheel 64, that it engages a constantly revolving pinion 76.

It will be understood from the above description that the laminations are inserted at a first location, in the area of the track section 6, while they are removed at a second location, in the area of or above the track section 6c.

At this moment the feeler roll 48 has reached the end of the cam 50 and the switch 52 is opened. The pull magnet 34 is de-energized, that is, the push-rod 36 is disengaged from the pinion 38 and is pulled back into its starting position under the action of a spring 78. The lever 54 is thus also turned back and the push-rod 56 returns to its original position under the effect of the spring 58.

The laminations 100 contained in the carriage 4' are engaged in the meantime by the pair of transport rollers 60 and pushed jointly into guide slots 80 of a pivotable guide plate 82, while the gear wheel 64, and with it the cam disks 66, 68 turn in the direction of the arrow. A support plate 83 is arranged underneath guide plate 82. A roller 84 running on the elevated portion of the cam disk 66 holds the guide plate 82 over a lever 86 and a bar 88 in the position indicated in FIG. 1 until the front portions or heads of the adjacent laminations 100 have been pushed by the transport rollers 60 by a certain amount, for example, by 15 millimeters, beyond the upper apex of a waxing roll 90.

At this moment the roller 84 has reached the end of the elevated portion of the cam disk 66, that is, the guide plate 62 descends, with a recess 92 releasing the laminations 100 in the range of the waxing roll 90 on the latter, and the waxing of the laminations starts. The important parts of the waxing device are represented in FIGS. 3a and 3c once again on an enlarged scale, shortly after the start of the waxing process. The other processes will be described on the basis of these figures, as well as with reference to FIGS. 3d and 3d, taking into account FIG. 1.

The amount of was applied to the waxing roll 90, from a wax tank 94 (FIG. 1) filled with liquid wax, over a feed roll 96 can be varied accurately by a stripping device on the roll 90. This device consists of a stripping plate 98 which extends over the entire axial length of the surface of the waxing roll 90, provided with wax, and which is secured to a swivel arm 102.

On the arm 102 is also secured a feeler pin 104 which can be varied in length by means of a ring nut 106, and which constantly slides along the wax-free edge of the waxing-roll surface, under the action of a spring 108. By turning the ring nut 106, that is, by varying the length of the feeler pin 104, the gap between the stripping plate 98 and the surface of the waxing roll, and thus the amount of wax applied to the laminations 100 can be accurately adjusted. This gap remains constant even if the waxing roll 90 is out of true, since the stripping plate 98, due to its particular arrangement, follows all radial deviations of the waxing roll 90.

As it can be seen from FIGS. 3a and 3c, the laminations 100 are slightly flexed over the waxing roll 90 during the waxing process. The amount of this flexing depends upon the extent to which the guide plate 82 descends on the waxing roll and influences the thickness of the wax coat applied to the laminations 100 and their surface consistency. The inclination of the guide plate 82 toward the waxing roll 90, and thus the thickness and the surface of the wax layer or coat on the laminations can be adjusted by an adjustable and secured stop screw 110.

When the laminations 100 have moved by a certain amount, for example 15 mm., over the waxing roll 90, the roller 84 reaches again the elevated portion of the cam disk 66, that is, the guide plate 82 and thus the laminations 100 are lifted from the waxing roll 90. Shortly thereafter, an additional roller 112 reaches the elevated portion of the cam disk 68 and lifts a partly toothed push-rod 114 over a slide 116. The push-rod 114 thus engages with its toothed end a constantly revolving pinion 118 and is moved in the direction of the arrow and against the action of a spring 120 (FIG. 1).

The push-rod 114 takes along at the same time a linkage 122 which is axially displaceable in a sleeve 124 of the push-rod 114 and which is connected with a wire strap 126 guided under the laminations 100 in a slot 128 of the guide plate 82. The wire strap 126 guides in the course of its linear movement, caused by the displacement of the push-rod 114, the end of the laminations 100 over the waxing roll 90, as shown in FIGS. 3b and 3d.

This movement of the lamination ends over the waxing roll is necessary, as mentioned above, so that the ends of the laminations—which have the tendency, due to the slight flexing during the waxing (FIGS. 3a and 3c), to flex downward, that is, in the direction of the waxing roll 90—do not come again in contact with the waxing roll 90 and are covered with wax.

After the wire strap 126 has conducted the ends of the laminations 100 over the waxing roll 90, the roller 112 reaches the end of the elevated portion of the cam disk 68, the push-rod 114 is disengaged from the pinion 118 and is pulled back into its starting position under the action of the spring 120 (FIG. 1).

At the same time the untoothed portion 70 of the gear wheel 64 reaches the pinion 76 so that the wheel 64 and thus the cam disks 66, 68 remain in the position shown in FIG. 1. The above-described unloading and waxing procedure can, therefore, start again when another filled carriage 4' arrives at the holding magnets 30. The pair of transport rollers 60 is followed, behind the waxing apparatus proper, by another pair of transport rollers 130. The distance between the two is less than one lamination length, that is, the heads or front edges of the laminations 100 are engaged by the pair of transport rollers 130 before the ends thereof have left the pair of rollers 60.

Behind the waxing roll 90 is arranged a cooling device in the form of a nozzle plate 132 to which supercooled compressed air is fed through a conduit 134. The liquid wax applied in hot condition to the laminations 100 solidifies therefore, even before reaching the transport rollers 130, that is, the wax coat can no longer be destroyed or impaired by the latter, and the wax cannot become deposited on these rollers. The rollers 130 convey the finished, waxed laminations 100 either to available cases or containers (not shown), or over additional conveyer means directly to a layer radiography device for X-ray anti-diffusing screens.

On the basis of FIGS. 2 and 6, the process will now be described which takes place after the complete emptying of the carriage 4', held by the magnets 30, by the transport rollers 60 (FIG. 1). The time during which the aforementioned time relay keeps the magnets 30 energized corresponds to the time which is necessary for the complete emptying of the carriage 4'. After this period the holding magnets drop out, the empty carriage 4" drops on the track section 6c of the conveyer track, represented in broken lines, and rolls over a fourth track section 6d which is made in the form of a plane inclined toward fifth track section or rocker section 6e. The rocker is held under the action of an adjustable counterweight 136 in the position represented by solid lines, until an empty carriage arrives.

Due to the mass of the empty carriage, the rocker 6e descends into the position indicated by broken lines and forms an inclined plane on which the empty carriage 4" arrives in steps into the range of an apparatus 138 for moving the carriage 4, again in steps, to receive again laminations 100. In case another empty carriage 4" is released by the holding magnets 30 during the time while the rocker 6e is in the broken-line position, a stop 140 is provided on the section 6d of the conveyer track, which is controlled in dependence on the position of the rocker 6e in such a way that the respective carriage 4" can only roll on the rocker when the latter is in the solid-line position. The track section 6e has a stationary stop 140' for stopping the carriages 4" when rolled down from track 6d.

The operation of the apparatus 138 (FIG. 2) for moving the carriage in steps during the reception of laminations will be described hereafter, with reference to FIG. 4. On the underside of each carriage 4 are arranged two rows of pins 44. The distance of the pins of one row to each other corresponds to the width of a groove 42 (FIGS. 1 and 2) including one of the straps of the carriage arranged in between.

Below the sections of the conveyer track 6 (FIG. 2) is secured a guide sleeve 142 in which moves a slide 144. At the two ends of a yoke 146, secured to the slide 144, are arranged pawls 148 which bear on stops 150, under the action of a spring 152. The rollers on which the carriages slide over the conveyer track are designated with 46 (FIGS. 1, 2, and 4).

A switching rod 154 is connected with the drive of the cutting tool for the lead laminations and transmits at each stroke of the cutting tool an impulse in the direction of the arrow. This movement of the rod 154 is transmitted over a double lever 156 to a toggle-lever joint 158 which, in turn, pushes the slide 144 against the action of a spring 160, in the direction of the arrow.

The pawls 148 push the pins 44, behind which they are arranged in a straight line in the represented rest position, and thus also the carriage 4 by one step forward. These pins 44 press against the inclined flanks of two additional pawls 162, rigidly connected with the conveyer track 6, which bear in the rest position on stops 166, under the action of springs 164. The pawls 162 are pressed by the pins 44 against the springs 164 and come to lie behind these pins after their tips have passed the lateral apices of the pins 44.

At the same time, however, the movement of the switching rod 154 is also at an end, the toggle-lever joint 158 is pulled back by the spring 160 into the represented position, and takes along the slide 144 and the pawls 148. The pins which follow press the paws in the direction of the arrow, which in turn move behind the following pins 44 under the action of the spring 152, after passing the lateral apices of the pins. The apparatus is thus ready again for the next step.

In order to effectively prevent yielding to the front of the carriage 4 from its position secured by the pawls 162 against running back, due to jerky vibrations caused by the operation of the equipment, bars 168 are arranged at both longitudinal sides of the carriage, rigidly connected with the conveyer track, in the range of the stepwise moving carriage 4. In these bars 168 are embedded spring-loaded balls 170 which engage dish-shaped depressions 172 on the long sides of the carriage in the defined loading positions of the carriage 4.

The distances of the pins 44 to the front and rear edges of each carriage are half the size of the distances of the pins 44 from each other. This way it is possible to engage immediately with the pawls 148 the first pins 44 of the following carriage 4" after the last pins of the carriage 4 have been displaced by said pawls 148. The following carriage is already sufficiently secured by the balls 170, arranged in the dish-shaped depressions 172 of the carriage 4" against returning, due to the action of the returning pawls 148.

FIG. 5 shows the device for stopping a filled carriage 4' in the range of the pneumatic lifting device 14. The filled carriage 4' receives on the section 6a (FIG. 2) of the conveyer track a certain acceleration and strikes with its first pin 44 against the inclined flanks of the two pawls (stopping devices) 8 which are pressed on in the direction of the arrow and which subsequently move behind the pins 44 under the action of springs 174. At the same time the plunger 10' of the limit switch 10 (FIG. 2) was displaced by the end wall of the arriving carriage 4" so that the pneumatic lifting device 14 is released over this limit switch 10.

The carriage 4' is then moved upward, as described before, that is, below the drawing plane of FIG. 5, so that the pawls 8 do not hinder this movement, while they effectively prevent the carriage 4' from rolling back on the conveyer track.

The foregoing disclosure relates only to a preferred, exemplary embodiment of the invention, which is intended to include all changes and modifications of the method described within the scope of the invention as set forth in the appended claims.

What we claim is:

1. A method for waxing lined and cut laminations for X-ray anti-diffusing screens, comprising the steps of inserting a number of previously cut and lined laminations one by one into carriage means at a first location while moving said carriage means stepwise in a direction transverse to the direction in which said laminations are inserted, transporting said carriage means to a second location spaced apart from said first location, removing said laminations simultaneously from said carriage means at said second location, and subsequently waxing said laminations.

2. A waxing method as defined in claim 1, further comprising the step of cooling said laminations subsequent to said waxing step.

3. A waxing method as defined in claim 1, further comprising the step of returning the empty carriage means from said second location, subsequent to said removing step, into ready position at said first location, so as to keep said carriage means available for the inserting step of the next operational cycle.

4. A waxing method as defined in claim 3, wherein said inserting and said removing steps are performed substantially simultaneously at the respective first and second locations.

5. A waxing method as defined in claim 4, wherein said steps are performed cyclically in an uninterrupted manner by the aid of at least two carriages forming part of said carriage means.

6. A waxing method as defined in claim 1, wherein said transporting step is performed by vertical movement between said first and said second locations which are at vertically spaced-apart levels.

7. A waxing method as defined in claim 1, wherein said removing and said waxing steps are performed in a single continuous and substantially rectilinear operation.

References Cited

UNITED STATES PATENTS

| | | | |
|---|---|---|---|
| 1,482,090 | 1/1924 | Overbury | 117—48 X |
| 2,698,001 | 12/1954 | Lang | 118—247 X |
| 2,700,449 | 1/1955 | Gleason et al. | |
| 2,760,077 | 8/1956 | Longini | 117—66 X |
| 2,917,884 | 12/1959 | Winkler et al. | |
| 3,070,457 | 12/1962 | Labombarde | 118—69 X |
| 3,143,738 | 8/1964 | Bigelow | 117—66 X |
| 3,279,664 | 10/1966 | Lynch | 214—7 X |

ALFRED L. LEAVITT, Primary Examiner

T. E. BOKAN, Assistant Examiner

U.S. Cl. X.R.

117—111, 119.2; 214—152